United States Patent
Wang

(10) Patent No.: US 7,944,639 B1
(45) Date of Patent: May 17, 2011

(54) DISK DRIVE ADAPTING EQUALIZER RELATIVE TO BIT ERROR RATE OF SEQUENCE DETECTOR

(75) Inventor: Alvin J. Wang, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 187 days.

(21) Appl. No.: 12/178,430

(22) Filed: Jul. 23, 2008

(51) Int. Cl.
*G11B 5/53* (2006.01)
*G11B 5/09* (2006.01)

(52) U.S. Cl. .......................................... 360/65; 360/39

(58) Field of Classification Search ........................ None
See application file for complete search history.

(56) References Cited

U.S. PATENT DOCUMENTS

| | | | |
|---|---|---|---|
| 5,784,415 A | 7/1998 | Chevillat et al. | |
| 5,809,080 A | 9/1998 | Karabed et al. | |
| 6,185,175 B1 | 2/2001 | Zook | |
| 6,600,617 B1 | 7/2003 | Zeng | |
| 7,155,660 B1 | 12/2006 | Burd | |
| 7,184,237 B2 | 2/2007 | Shi | |
| 7,191,083 B2 | 3/2007 | Ashley et al. | |
| 7,194,674 B2 | 3/2007 | Okumura et al. | |
| 7,746,970 B2 * | 6/2010 | Mergen et al. | ................. 375/350 |
| 2007/0076826 A1 | 4/2007 | Stockmanns et al. | |
| 2007/0201585 A1 | 8/2007 | Feng | |
| 2008/0007854 A1 * | 1/2008 | Lin et al. | ......................... 360/39 |

OTHER PUBLICATIONS

Office Action dated May 7, 2010 from U.S. Appl. No. 12/178,474, 12 pages.
Notice of Allowance dated Oct. 15, 2010 from U.S. Appl. No. 12/178,474, 10 pages.

* cited by examiner

*Primary Examiner* — Daniell L Negrón

(57) ABSTRACT

A disk drive is disclosed comprising a disk and a head actuated radially over the disk, wherein the head generates a read signal. A sampling device samples the read signal to generate a sequence of read signal samples, and an equalizer comprising a plurality of coefficients, equalizes the read signal samples to generate a sequence of equalized samples. A sequence detector detects an estimated data sequence from the equalized samples, wherein the sequence detector operates according to a target response comprising a plurality of target values. Control circuitry adapts the equalizer coefficients by computing error values in response to a difference between expected samples and the equalized samples, computing a gradient in response to a correlation of the read signal samples with the error values, and adjusting at least one of the equalizer coefficients in response to the gradient.

16 Claims, 2 Drawing Sheets

DISK DRIVE ADAPTING EQUALIZER RELATIVE TO BIT ERROR RATE OF SEQUENCE DETECTOR

BACKGROUND

Description of the Related Art

Disk drives comprise a read channel for processing the read signal emanating from the head in order to demodulate the data recorded on the disk surface. The read channel typically comprises a sampling device for sampling the read signal to generate a sequence of read signal samples, an equalizer comprising a plurality of coefficients for equalizing the read signal samples to generate a sequence of equalized samples, and a sequence detector for detecting an estimated data sequence from the equalized samples according to a target response. Any suitable target response may be employed, such as a suitable partial response (e.g., PR4, EPR4, etc.), and any suitable sequence detector may be employed (e.g., Viterbi, Turbo Decoder, etc.).

The accuracy of the sequence detector is affected by the performance of the equalizer, wherein techniques have been employed to adapt the equalizer coefficients in order to optimize performance. Prior art techniques for adapting the equalizer typically attempt to adjust the equalizer coefficients according to a gradient that minimizes noise power and intersymbol interference (ISI) in terms of minimum mean squared error (MMSE), least mean squared error (LMS), or a zero forcing (ZF) algorithm.

DETAILED DESCRIPTION OF EMBODIMENTS OF THE INVENTION

Figure 1A:
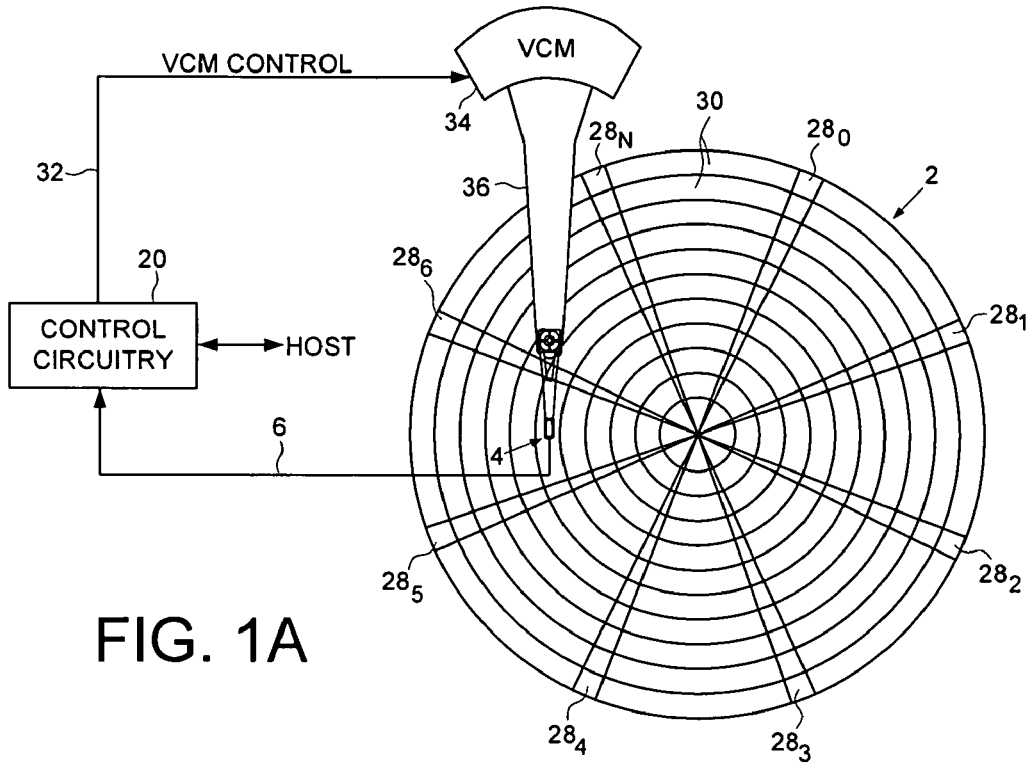
FIG. 1A shows a disk drive according to an embodiment of the present invention comprising a disk, a head actuated over the disk, and control circuitry.

FIG. 1A shows a disk drive according to an embodiment of the present invention comprising a disk 2 and a head 4 actuated radially over the disk 2, wherein the head generates a read signal 6. A sampling device 8 (FIG. 1B) samples the read signal 6 to generate a sequence of read signal samples 10, and an equalizer 12 comprising a plurality of coefficients, equalizes the read signal 10 samples to generate a sequence of equalized samples 14. A sequence detector 16 detects an estimated data sequence 18 from the equalized samples 14, wherein the sequence detector 16 operates according to a target response comprising a plurality of target values. Control circuitry 20 adapts the equalizer coefficients by computing error values 22 in response to a difference between expected samples 24 and the equalized samples 14, computing a gradient 26 in response to a correlation of the read signal samples 10 with the error values 22, and adjusting at least one of the equalizer coefficients in response to the gradient. In one embodiment, the gradient is computed by scaling the correlation with at least one of the target values of the target response.

In the embodiment of FIG. 1A, the disk 2 comprises a plurality of embedded servo sectors $28_0$-$28_N$ which define a number of data tracks 30. Each servo sector 28 comprising coarse head positioning information (e.g., a track address) and fine head positioning information (e.g., servo bursts). The control circuitry 20 processes the read signal 6 to demodulate the servo sectors $28_0$-$28_N$ into a position error signal representing an error between a current radial location of the head 4 and a target radial location. The control circuitry 20 filters the position error signal with a suitable compensation filter to generate a control signal 32 applied to a voice coil motor (VCM) 34 which rotates an actuator arm 36 about a pivot in a direction that reduces the position error signal.

Any suitable sequence detector 16 may be employed in the embodiments of the present invention, such as a suitable Viterbi detector. In addition, the sequence detector 16 may operate according any suitable target response, such as a partial response (e.g., PR4, EPR4, EEPR4, etc.). The target values of the target response may be characterized by a suitable polynomial (e.g., $1-D^2$ for a PR4 response), wherein the coefficients of the polynomial may comprise any suitable values, including fractional values.

In one embodiment, the expected samples 24 are generated by convolving the estimated data sequence 18 with an ideal polynomial representation of the channel. In another embodiment, the expected samples 24 are generated by convolving a training data sequence with an ideal polynomial representation of the channel. The training data sequence may be prerecorded on the disk (e.g., using an external servo writer or stamping technique) or it may be written to the disk by the control circuitry 20.

In one embodiment of the present invention, the coefficients of the equalizer 12 are adapted by computing a gradient that attempts to minimize the bit error rate of the sequence detector 16. For example, in the embodiment wherein the sequence detector comprises a Viterbi detector, an error event occurs when:

$$\sum_k (y_k - d_k^i)^2 < \sum_k (y_k - d_k)^2$$

where $y_k$ represents a sequence of equalized sample values, $d_k$ represents the correct sequence of expected sample values, $d_k^i$ represents an alternative sequence of expected sample values. Therefore, the probability of a Viterbi detector making an error in the presence of an error event $e_a^i$ can be represented as:

$$Pr(eer^i | e_a^i) = Pr\left\{\sum_k (y_k - d_k^i)^2 < \sum_k (y_k - d_k)^2\right\}.$$

The above equation for representing an error event can be expanded into:

$$\sum_k \left[(d_k^i)^2 - (d_k)^2 - 2y_k(d_k^i - d_k)^2\right] < 0.$$

Letting $y_k = d_k + z_k$ where $z_k$ consists of statistical noise and residual intersymbol interference (ISI). Also let $d_k^i = (a^i * g)_k$ and $d_k = (a*g)_k$ where a is a NRZ input sequence and g represents the target values of the target response. With $a_k^i - a_k = 2 \cdot e_{ak}^i$, the above equation for representing an error event can be represented as:

$$\sum_k [(e_a^i * g)_k]^2 - \sum_k (e_a^i * g)_k \cdot z_k < 0.$$

Letting $e_{yk}^i = (e_a^i * g)_k$ the above equation can be written as:

$$\sum_k [e_{yk}^i]^2 - \sum_k e_{yk}^i \cdot z_k < 0.$$

Observe $z_k$ is a statistic quantity consisting of residual ISI and statistical colored noise. Assume the summation in the above equation accounts for N consecutive samples during the error event observation window, then the error-making condition becomes:

$$\sum_{k=0}^{N-1} [e_{yk}^i]^2 - \sum_{k=0}^{N-1} e_{yk}^i \cdot z_k < 0.$$

Define column vectors:

$e_y^i = [e_{y0}^i e_{y1}^i L e_{yN-1}^i]^T$ and $z = [z_0 z_1 L z_{N-1}]^T$ then the above equation becomes:

$e_y^{iT} e_y^i - e_y^{iT} z < 0.$

Observe that $e_y^{iT} e_y^i - e_y^{iT} z$ is a Gaussian stochastic variable with mean value $M = e_y^{iT} e_y^i$ and variance $V = e_y^{iT} E\{zz^T\} e_y^i$. Thus we can use the Q function:

$$Q(x) = \frac{1}{\sqrt{2\pi}} \int_x^\infty e^{-u^2/2} du$$

to write the error event probability equation as:

$$Pr\{e_y^{iT} e_y^i - e_y^{iT} z < 0\} = Q\left(\frac{e_y^{iT} e_y^i}{\sqrt{e_y^{iT} E\{zz^T\} e_y^i}}\right).$$

Defining $R^z = E\{zz^T\}$ and the Viterbi pre-detection effective signal-to-noise ratio as $\rho_i^2 = M^2/V$ the error event probability equation can be written as:

$$Pr(eer^i | e_a^i) = Q(\rho_i) = Q(M/\sqrt{V})$$

where:

$$\rho_i = \frac{e_y^{iT} e_y^i}{\sqrt{e_y^{iT} R^z e_y^i}}.$$

For error event $e_{ak}^i$ with number $\lambda^i$ of error bits in the pattern, the bit error occurrence probability is:

$Pr(e_a^i) = 2^{1-\lambda^i} \cdot \lambda^i.$

Consider $\kappa+1$ number of dominant error events $e_{ak}^i$, the error event probability equation can be approximated as $$\sum_{i=0}^{\kappa} Pr(eer^i | e_a^i) Pr(e_a^i) = \sum_{i=0}^{\kappa} Q\left(\frac{e_y^{iT} e_y^i}{\sqrt{e_y^{iT} R^z e_y^i}}\right) 2^{1-\lambda^i} \lambda^i = \sum_{i=0}^{\kappa} Q(\rho_i) 2^{1-\lambda^i} \lambda^i.$$

From the above equation, the higher $\rho_i$ the lower the probability of error. For a specific error event $e_{ak}^i$, maximizing $\rho_i$ means minimizing:

$E = e_y^{iT} R^z e_y^i.$

In one embodiment, the coefficients of the equalizer 12 are adapted in response to a gradient that minimizes the above E. Consider an example embodiment wherein the read channel comprises the dominant error events +, +−, +−+ and +0+, and the target response comprises the target values $g = [g_0 \, g_1 \, g_2]^T$, then the error event contributor $e_y^i$ to E can be represented in the following table:

TABLE 1

| $e_{ak}^i$ | $e_y^i = [e_{yk}^i = (e_a^i * g)_k]$ |
|---|---|
| + | $[g_0, g_1, g_2]^T$ |
| +− | $[g_0, g_1 - g_0, g_2 - g_1, -g_2]^T$ |
| +−+ | $[g_0, g_1 - g_0, g_2 - g_1 + g_0, -g_2 + g_1, -g_2]^T$ |
| +0+ | $[g_0, g_1, g_2 + g_0, g_0, g_2]^T$ |

The noise correlation matrix $R^z$ can be written as:

$$R^z = \begin{vmatrix} e_k e_k & e_k e_{k-1} & e_k e_{k-2} & L \\ e_k e_{k-1} & e_{k-1} e_{k-1} & e_{k-1} e_{k-2} & L \\ e_k e_{k-2} & e_{k-1} e_{k-2} & e_{k-2} e_{k-2} & L \\ L & L & L & L \end{vmatrix}.$$

Using the above equations, it is possible to compute the gradient for each error event that minimizes E. For example, for the '+' error event, E is computed as:

$$E = [g_0 \, g_1 \, g_2] \begin{vmatrix} e_k e_k & e_k e_{k-1} & e_k e_{k-2} \\ e_k e_{k-1} & e_{k-1} e_{k-1} & e_{k-1} e_{k-2} \\ e_k e_{k-2} & e_{k-1} e_{k-2} & e_{k-2} e_{k-2} \end{vmatrix} \begin{vmatrix} g_0 \\ g_1 \\ g_2 \end{vmatrix} = \sum_{i=0}^{2} \sum_{j=0}^{2} g_i g_j e_{k-i} e_{k-j}.$$

Computing $$\frac{\partial E}{\partial w_m}$$

as the adaptation gradient $\Delta_{wm}$ for the $w_m$ coefficient:

$$\Delta_{wm} = \frac{\partial E}{\partial w_m} = \sum_{i=0}^{2} \sum_{j=0}^{2} g_i g_j \left(e_{k-i} \frac{\partial e_{k-j}}{\partial w_m} + \frac{\partial e_{k-i}}{\partial w_m} e_{k-j}\right).$$

The above equation can be rewritten as:

$$\Delta_{wm} = \sum_{i=0}^{2}\sum_{j=0}^{2} g_i g_j (e_{k-i} x_{k-m-j} + e_{k-j} x_{k-m-i}).$$

Therefore, in one embodiment, the $w_m$ coefficient is updated according to:

$$w_m(k+1) = w_m(k) - \mu \cdot \sum_{i=0}^{2}\sum_{j=0}^{2} g_i g_j (e_{k-i} x_{k-m-j} + e_{k-j} x_{k-m-i})$$

where m=0, 1, 2, L, N−1 and μ is the update gain.

Figure 1B:
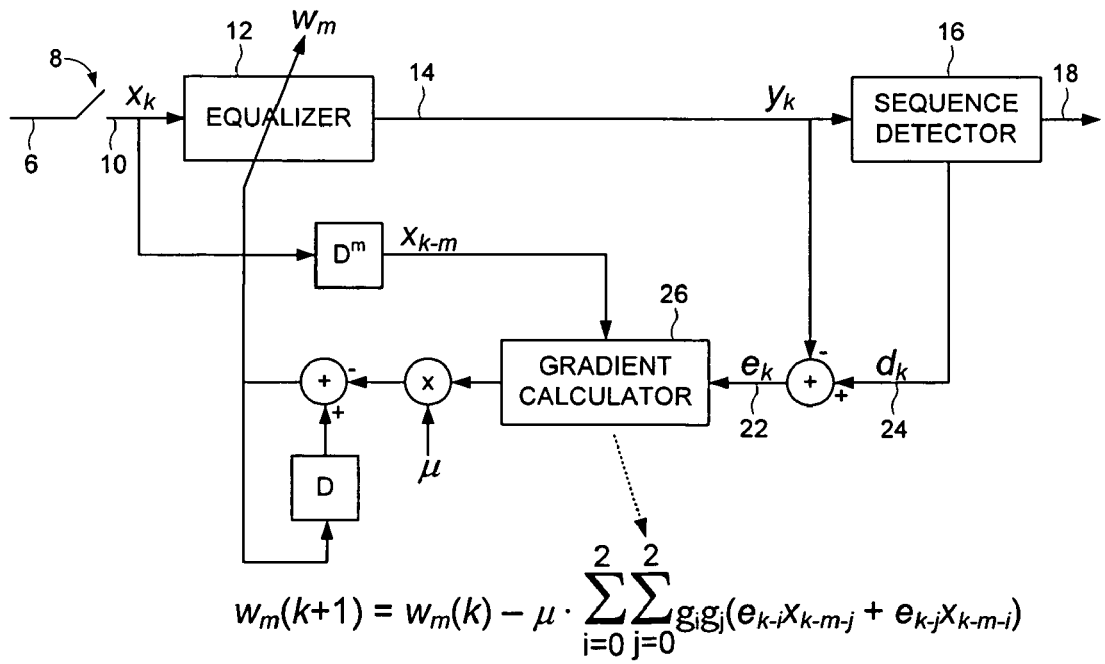
FIG. 1B shows control circuitry according to an embodiment of the present invention including a gradient calculator for computing an equalizer adapting gradient in response to a correlation of read signal samples with error values.

FIG. 1B illustrates example circuitry for implementing the above equation for the '+' error event when the target response comprises three target values $g=[g_0\ g_1\ g_2]^T$. However, the above equations and corresponding circuitry can be generated for any number of target values of a target response and for any error event.

In one embodiment, the sign of the error values are used to compute the gradient in order to simplify the circuitry. In the above example for the '+' error event, the above equation can be written as:

$$\Delta_{wm} = \sum_{i=0}^{2}\sum_{j=0}^{2} g_i g_j (\text{sign}(e_{k-i}) x_{k-m-j} + \text{sign}(e_{k-j}) x_{k-m-i})$$

or equivalently:

$$\Delta_{wm} = 2g_0^2 x_{k-m} + 2g_1^2 x_{k-m-1} + 2g_2^2 x_{k-m-2} + x_{k-m} \cdot [g_0 g_1 \cdot \text{sign}(e_{k-1}) + g_0 g_2 \cdot \text{sign}(e_{k-2})] + x_{k-m-1} \cdot [g_0 g_1 \cdot \text{sign}(e_k) + g_0 g_2 \cdot \text{sign}(e_{k-2})] + x_{k-m-2} \cdot [g_0 g_2 \cdot \text{sign}(e_k) + g_1 g_2 \cdot \text{sign}(e_{k-1})].$$

Figure 2:
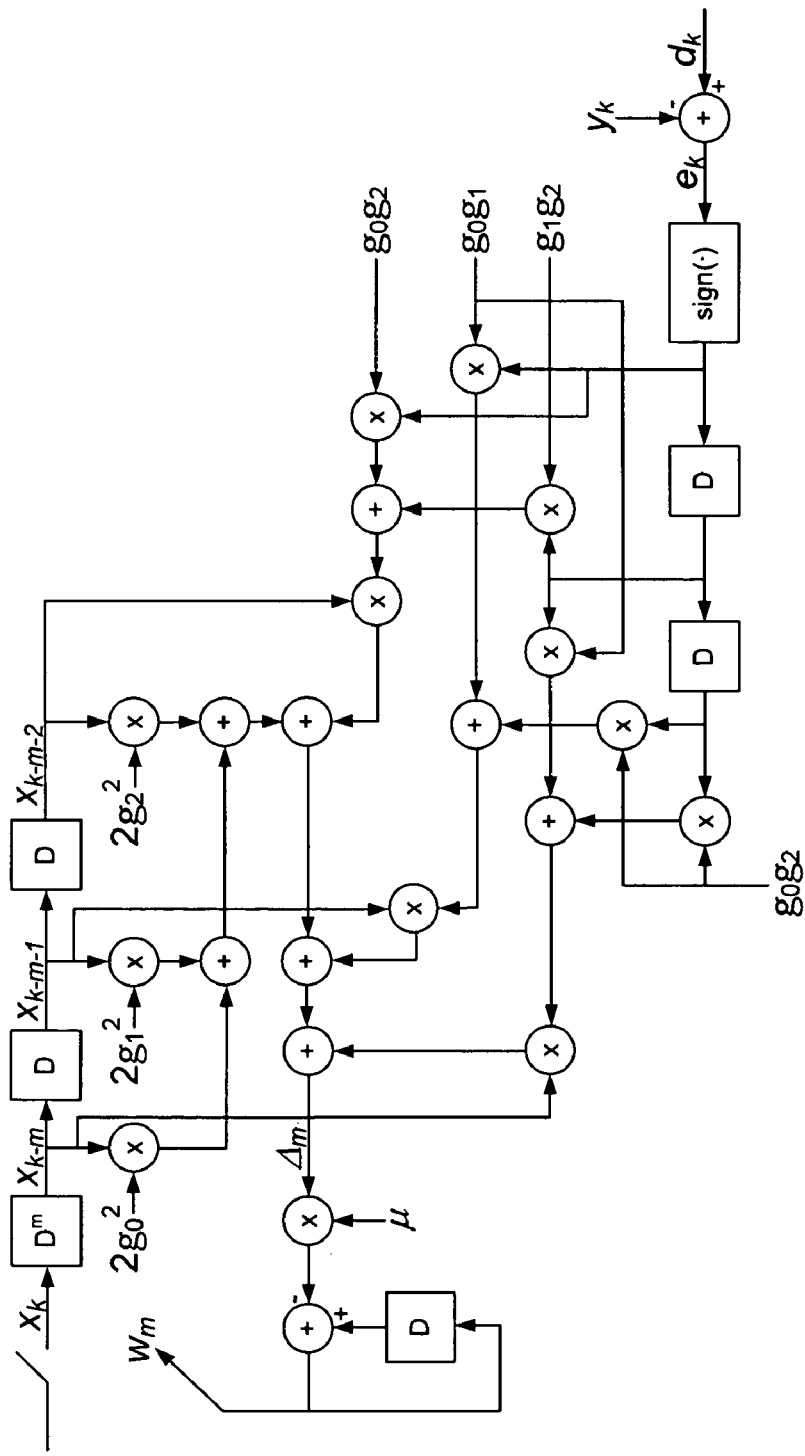
FIG. 2 shows control circuitry according to an embodiment of the present invention for computing the gradient in response to a sign of the error values.

FIG. 2 shows example circuitry for implementing the above equation, wherein similar circuitry may be employed for other error events and/or other number of target values in the target response.

Any suitable control circuitry may be employed to implement the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller.

In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk;
   a head actuated radially over the disk, the head operable to generate a read signal;
   a sampling device operable to sample the read signal to generate a sequence of read signal samples;
   an equalizer comprising a plurality of coefficients, the equalizer operable to equalize the read signal samples to generate a sequence of equalized samples;
   a sequence detector for detecting an estimated data sequence from the equalized samples, wherein the sequence detector operates according to a target response comprising a plurality of target values; and
   control circuitry operable to adapt the equalizer coefficients by:
     computing error values in response to a difference between expected samples and the equalized samples;
     computing a gradient in response to a correlation of the read signal samples with the error values; and
     adjusting at least one of the equalizer coefficients in response to the gradient.

2. The disk drive as recited in claim 1, wherein the control circuitry is operable to compute the gradient by scaling the correlation by at least one of the target values of the target response.

3. The disk drive as recited in claim 1, wherein the control circuitry is operable to compute the gradient in response to an error event of the sequence detector.

4. The disk drive as recited in claim 3, wherein the error event comprises a '+' error event.

5. The disk drive as recited in claim 4, wherein the control circuitry is operable to compute the gradient according to:

$$\Delta_{wm} = \sum_{i=0}^{2}\sum_{j=0}^{2} g_i g_j (e_{k-i} x_{k-m-j} + e_{k-j} x_{k-m-i})$$

where:
   the equalizer comprises three coefficients $w_0$-$w_2$;
   the target response comprises three target values $g_0$-$g_2$;
   $\Delta_{wm}$ is a gradient for the $w_m$ coefficient;
   $e_k$ are the error values; and
   x is a read signal sample.

6. The disk drive as recited in claim 4, wherein the control circuitry is operable to compute the gradient according to:

$$\Delta_{wm} = \sum_{i=0}^{2}\sum_{j=0}^{2} g_i g_j (\text{sign}(e_{k-i}) x_{k-m-j} + \text{sign}(e_{k-j}) x_{k-m-i})$$

where:
   the equalizer comprises three coefficients $w_0$-$w_2$;
   the target response comprises three target values $g_0$-$g_2$;
   $\Delta_{wm}$ is a gradient for the $w_m$ coefficient;
   $e_k$ are the error values; and
   x is a read signal sample.

7. The disk drive as recited in claim 3, wherein the control circuitry is operable to compute the gradient in response to the error event convolved with the target values of the target response.

8. The disk drive as recited in claim 7, wherein the control circuitry is operable to compute the gradient by minimizing:

$$e_{y'}^{iT} R^z e_{y'}^{i}$$

where:
$e_{y'}^{i}$ represents the error event convolved with the target values of the target response; and
$R^z$ is a noise correlation matrix.

9. A method of operating a disk drive, the disk drive comprising a disk, a head actuated radially over the disk, the head operable to generate a read signal, a sampling device operable to sample the read signal to generate a sequence of read signal samples, an equalizer comprising a plurality of coefficients, the equalizer operable to equalize the read signal samples to generate a sequence of equalized samples, and a sequence detector for detecting an estimated data sequence from the equalized samples, wherein the sequence detector operates according to a target response comprising a plurality of target values, the method comprising:
computing error values in response to a difference between expected samples and the equalized samples;
computing a gradient in response to a correlation of the read signal samples with the error values; and
adjusting at least one of the equalizer coefficients in response to the gradient.

10. The method as recited in claim 9, wherein computing the gradient comprises scaling the correlation by at least one of the target values of the target response.

11. The method as recited in claim 9, wherein the gradient is computed in response to an error event of the sequence detector.

12. The method as recited in claim 11, wherein the error event comprises a '+' error event.

13. The method as recited in claim 12, wherein computing the gradient comprises minimizing:

$$e_{y'}^{iT} R^z e_{y'}^{i}$$

where:
$e_{y'}^{i}$ represents the error event convolved with the target values of the target response; and
$R^z$ is a noise correlation matrix.

14. The method as recited in claim 12, wherein the gradient is computed according to:

$$\Delta_{wm} = \sum_{i=0}^{2} \sum_{j=0}^{2} g_i g_j (e_{k-i} x_{k-m-j} + e_{k-j} x_{k-m-i})$$

where:
the equalizer comprises three coefficients $w_0$-$w_2$;
the target response comprises three target values $g_0$-$g_2$;
$\Delta_{wm}$ is a gradient for the $w_m$ coefficient;
$e_k$ are the error values; and
x is a read signal sample.

15. The method as recited in claim 11, wherein the gradient is computed in response to the error event convolved with the target values of the target response.

16. The method as recited in claim 12, wherein the gradient is computed according to:

$$\Delta_{wm} = \sum_{i=0}^{2} \sum_{j=0}^{2} g_i g_j (\text{sign}(e_{k-i}) x_{k-m-j} + \text{sign}(e_{k-j}) x_{k-m-i})$$

where:
the equalizer comprises three coefficients $w_0$-$w_2$;
the target response comprises three target values $g_0$-$g_2$;
$\Delta_{wm}$ is a gradient for the $w_m$ coefficient;
$e_k$ are the error values; and
x is a read signal sample.

* * * * *